(No Model.)
J. E. ROOT.
COUPLING GUARD FOR BELL ROPES.
No. 362,398. Patented May 3, 1887.
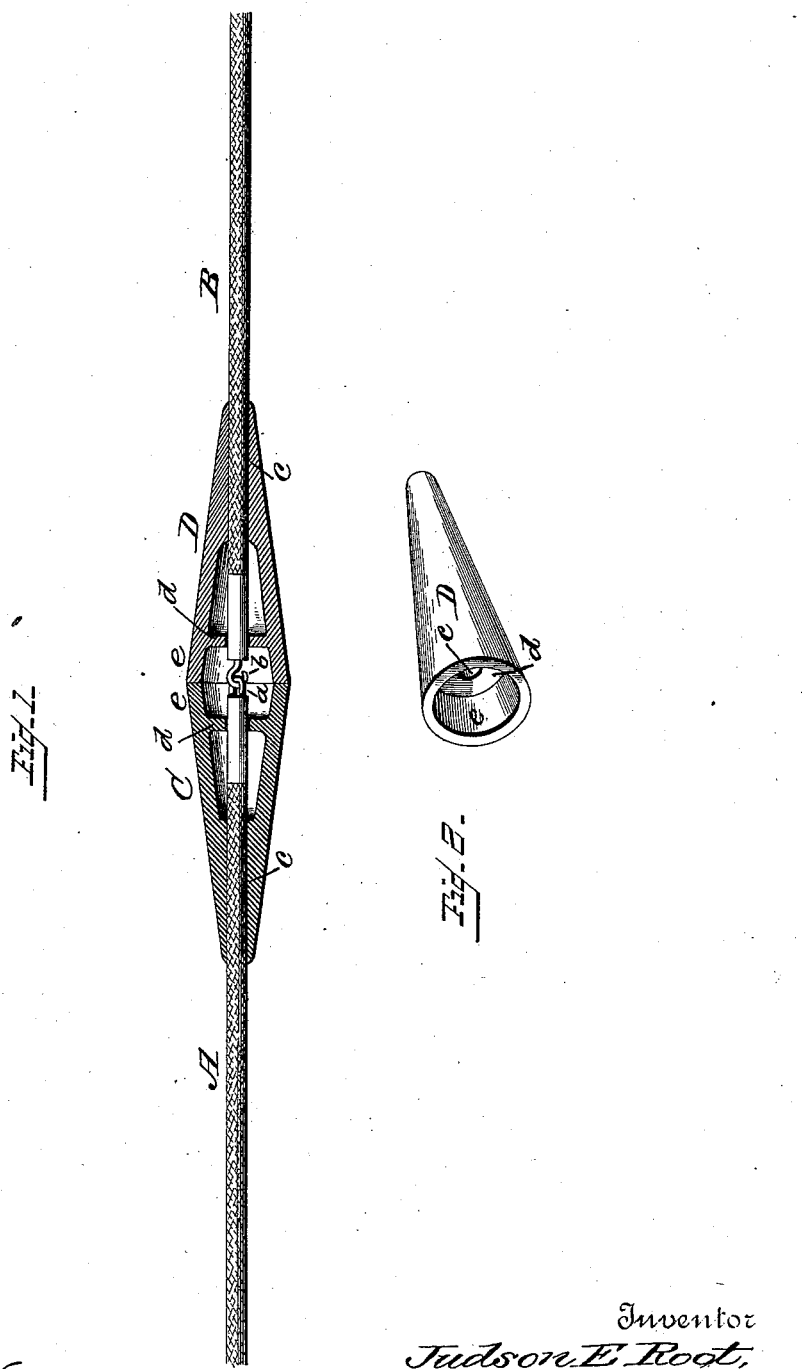
Witnesses
Inventor
Judson E. Root,
By his Attorney

UNITED STATES PATENT OFFICE.

JUDSON E. ROOT, OF WESTFIELD, N. Y., ASSIGNOR OF ONE-HALF TO ROLLIN D. ROCKWELL AND EDWIN H. DICKERMAN, BOTH OF SAME PLACE.

COUPLING-GUARD FOR BELL-ROPES.

SPECIFICATION forming part of Letters Patent No. 362,398, dated May 3, 1887.

Application filed January 27, 1887. Serial No. 225,663. (No model.)

*To all whom it may concern:*

Be it known that I, JUDSON E. ROOT, a citizen of the United States, residing at Westfield, in the county of Chautauqua and State of New York, have invented certain new and useful Improvements in Coupling-Guards for Bell Ropes or Cords; and I do hereby declare that the following is a full, clear, and exact description of the same, reference being had to the annexed drawings, making a part of this specification, and to the letters and figures of reference marked thereon.

Figure 1 of the drawings is a longitudinal section of my improved coupling-guard for bell ropes or cords, showing the latter in elevation and connected together; and Fig. 2 a detail view in perspective of one of the coupling-guard sections.

The present invention has for its object to facilitate the coupling or uncoupling of the ends of bell ropes or cords used on a train of cars; and it consists in the peculiar construction of the coupling-sections which form guards and are of rubber, and adapted to be operated in connection with each other by pressure, to couple or uncouple the ends of the ropes or cords, as will be hereinafter described, and subsequently pointed out in the claims.

In the accompanying drawings, A B represent the ends of a bell rope or cord which are desired to be connected together at certain points throughout the train of cars, so that each section of the cord can be disconnected from the other when the several cars are uncoupled and separated, the meeting ends of the cords having an eye, $a$, and hook $b$, or other preferred and well-known means, whereby the ends can be readily connected together or disconnected from each other, as circumstances require.

The coupling-sections C D which constitute my invention are molded or otherwise formed of rubber, and are conical in shape, as shown, and at their apex or smaller end are provided with a hole, $c$, of slightly less diameter than the rope or cord through which it passes.

The inner or larger ends of the rubber coupling sections or guards are provided with circular flanges $d$, which bear with frictional contact against the ends of the cord or rope sections, and immediately forward of these flanges are bearing-rims $e$, which come together or in contact with each other when the ropes or cords are coupled, as the case may be.

The ends of the cords or ropes A B are inserted through the holes $c$ by first inserting an expanding-tube and afterward passing the ends of the cords or ropes through it, and when the tubes are withdrawn the rubber will tightly hug the cords or ropes and hold them thereto by frictional contact. The flanges $d$, upon the interior of the coupling-sections, hold the ends of the cords or ropes in line with each other and prevent them from working sidewise or from lateral displacement. After the coupling-sections C D have been connected to the ends of the cord or rope, as shown, the latter are coupled or connected together by taking one of the rubber sections in each hand and pressing them together, the rims $e$ of course being brought in contact, and by pressing them in a direction toward each other will give sufficiently to allow the hook $b$ to be engaged with the eye $a$, and in like manner the hook and eye are disengaged from each other. When the ends of the cords or ropes are thus coupled together and the rubber coupling-sections released from the hands, the expanding-rims hereinbefore described will resume their normal position, and in so doing there will be a lengthwise strain on the cords or ropes to draw them taut, and this strain on the ropes or cords prevents the hook and eye from being disconnected.

The flanges $d$ not only serve as a means for holding the ends of the cord or rope in line and prevent lateral displacement and strain on the hook and eye in that direction, but serve as cushions to assist in lessening the jar on the cord or rope at its coupling ends, caused by the draw-head of the respective cars on a train coming together.

As will be noticed, a portion of the rubber coupling section or "guards," as they may be termed, form together a perfect protection for the coupled ends of the cords or ropes and prevent them from becoming accidentally detached from each other, and, as will be noticed, the coupling sections or guards are formed hollow a certain distance throughout their length, so that they will more readily expand and contract.

Having now fully described my invention, what I claim as new, and desire to secure by Letters Patent, is—

1. A coupling-guard for the ends of a cord or rope, consisting of two conical hollow rubber sections having their inner ends adjacent to each other and adapted to entirely cover the coupling and be held on the cord or rope by friction, substantially as and for the purpose set forth.

2. A coupling-guard for the ends of a cord or rope, consisting of two rubber sections provided with holes extending through them longitudinally and having interior flanges and bearings or expanding-rims upon their inner ends adapted to cover the coupling and held on the cord or rope by friction, substantially as and for the purpose specified.

In testimony that I claim the above I have hereunto subscribed my name in the presence of two witnesses.

J. E. ROOT.

Witnesses:
 JEROME LU DUE,
 ROBT. SHAW.